United States Patent
Vajda

(10) Patent No.: US 9,468,825 B2
(45) Date of Patent: Oct. 18, 2016

(54) LACROSSE STICK POCKET AND METHOD OF MANUFACTURE

(71) Applicant: John Vajda, Stewartstown, PA (US)

(72) Inventor: John Vajda, Stewartstown, PA (US)

(73) Assignee: WM. T. BURNETT IP, LLC, Baltimore, MD (US)

( * ) Notice: Subject to any disclaimer, the term of this patent is extended or adjusted under 35 U.S.C. 154(b) by 5 days.

(21) Appl. No.: 14/265,936

(22) Filed: Apr. 30, 2014

(65) Prior Publication Data

US 2014/0349788 A1 Nov. 27, 2014

Related U.S. Application Data

(60) Provisional application No. 61/826,557, filed on May 23, 2013.

(51) Int. Cl.
| | |
|---|---|
| A63B 59/02 | (2006.01) |
| A63B 65/12 | (2006.01) |
| B29K 19/00 | (2006.01) |
| B29L 31/52 | (2006.01) |
| B29C 45/14 | (2006.01) |
| B29K 75/00 | (2006.01) |

(52) U.S. Cl.
CPC ............. *A63B 59/02* (2013.01); *A63B 59/20* (2015.10); *B29C 45/14467* (2013.01); *B29K 2019/00* (2013.01); *B29K 2075/00* (2013.01); *B29L 2031/5245* (2013.01); *Y10T 83/04* (2015.04)

(58) Field of Classification Search
CPC ................................ A63B 59/02; A63B 65/12
USPC .................................. 473/505, 510, 512, 513
See application file for complete search history.

(56) References Cited

U.S. PATENT DOCUMENTS

| | | | |
|---|---|---|---|
| 4,034,984 A | 7/1977 | Crawford et al. | |
| 5,728,008 A * | 3/1998 | Howard | A63B 59/0092 473/308 |
| 6,966,854 B1 * | 11/2005 | Gait | A63B 59/20 473/513 |
| 7,524,253 B1 | 4/2009 | Gait | |
| 8,371,967 B2 | 2/2013 | Winningham et al. | |
| 2002/0160865 A1 * | 10/2002 | Brine, III | A63B 59/02 473/513 |
| 2007/0191153 A1 * | 8/2007 | Gait | A63B 59/02 473/513 |
| 2009/0253539 A1 * | 10/2009 | LoVine | A63B 59/0014 473/513 |
| 2011/0160007 A1 * | 6/2011 | Winningham | A63B 59/02 473/513 |
| 2014/0349788 A1 * | 11/2014 | Vajda | A63B 59/02 473/513 |
| 2015/0190691 A1 * | 7/2015 | Colchie | A63B 59/02 473/513 |

OTHER PUBLICATIONS

Webpage download, industrialrubbergoods1951, 2015, www.industrialrubbergoods.com/chlorosulfonated-polyethylene.html, 1 page.*

* cited by examiner

*Primary Examiner* — Gene Kim
*Assistant Examiner* — M Chambers
(74) *Attorney, Agent, or Firm* — Ober, Kaler, Grimes & Shriver; Royal W. Craig

(57) ABSTRACT

A ladder-like shooting/catching section for a lacrosse stick pocket defined by at least two elongate runners (flat strips) extending from proximate the scoop of the head toward the throat, and a plurality of generally V-shaped chevrons straddling the runners and overmolded thereto. Alternately, the chevrons and runners are formed from a single material. The chevrons have a three-dimensional profile and each is slightly concave along its length, such that the chevrons collectively define a passing/catching chute. The chute increases surface contact with the ball and improves feel. This in combination with the shock-absorbing living hinge function provided by the chevrons makes throwing and catching smoother as well as more consistent, generally improving playability of the lacrosse stick.

15 Claims, 5 Drawing Sheets

LACROSSE STICK POCKET AND METHOD OF MANUFACTURE

CROSS-REFERENCE TO RELATED APPLICATIONS

The present application claims the benefit under 35 U.S.C. §119(e) of U.S. Provisional Patent Application Ser. No. 61/826,557 filed May 23, 2013, which is incorporated herein by reference.

BACKGROUND OF THE INVENTION

1. Field of the Invention

The present invention relates to lacrosse and, more particularly, to an improved lacrosse stick pocket adapted for improved playing characteristics.

2. Description of the Background

FIG. 1 illustrates a conventional lacrosse stick 100 having a handle 102 and a double-wall synthetic head 104. Head 104 comprises a generally V-shaped frame having a juncture 106, sidewalls 108 and 110, a transverse wall (or "scoop") 112 joining the sidewalls at their ends opposite juncture 106, and a stop member (or "throat") 114 joining sidewalls 108 and 110 at their ends nearest juncture 106. As shown, handle 102 fits into and through juncture 106, and abuts stop member 114. A screw or other fastener placed through an opening in stop member 114 secures handle 102 to head 104.

A pocket 107 made of thongs and string may be attached to head 104. The pocket extends from upper thong holes 116 in transverse wall 112 to lower thong holes 118 in stop member 114. In some designs, upper thong holes 116 are located on tabs (not shown) of the scoop 112. On other designs, such as the design shown in FIG. 1, upper thong holes 116 are located directly on the scoop 112. FIG. 1 shows four pairs (116, 118) of thong holes that accept four thongs or perimeter side stringing to which thongs can be attached. To attach the lacrosse pocket, thongs are threaded around or otherwise attached to the thong holes 116 and strings are laced through string holes 120 in sidewalls 108 and 110, typically forming a number of diamonds in a cross-lace pattern as shown in FIG. 1. The typical features of a lacrosse stick pocket are also shown generally in Crawford et al., U.S. Pat. No. 4,034,984.

It is well-known to include one or more vertically-oriented (scoop to throat) runners at the center of the pocket made of different material and having a different structure than the rest of the pocket, and a plurality of cross-pieces extending transversely to support them. The runners form a chute or channel for the ball and improve feel and playability when catching or throwing. However, they also make stringing and attaching a lacrosse pocket to a head more difficult.

Some manufacturers have attempted to resolve the above issue with a preform pocket. For example, U.S. Pat. No. 7,524,253 to Gait generally describes a pre-formed pocket including runners having two layers of multiple types of different materials and perpendicular cross pieces strung between the runners. While this construction provides an easy-to-install runner system, it requires significant skill to precisely position and connect the cross pieces to the multilayered runners, and the runners themselves must have both a top and bottom layer that need to be sewn or otherwise held together. This configuration is more susceptible to wear, and increases manufacturing complexity and cost.

U.S. Pat. No. 8,371,967 to Winningham et al. shows a lacrosse head pocket with an elongated single layer runner with multiple cross pieces. The single layer runner is entirely overmolded over the cross pieces which simplifies manufacturing, but provides less than ideal performance because the all-elastomer channel can be too springy and repel the ball, especially in women's sticks where the game rules require much tighter stringing than in men's sticks.

Because of these deficiencies, there remains room for improvement in both structural configuration and materials used.

SUMMARY OF THE INVENTION

It is, therefore, an object of the present invention to provide a preformed shooting/catching section of a lacrosse stick pocket including a plurality of runners formed of one material and joined by chevron formed of another material straddling the runners in a ladder-like configuration for improved playability. It is also an object of the present invention to provide a preformed shooting/catching section wherein said runners and said straddling members are formed of the same material having variable thickness.

The present invention is a shooting/catching section for a lacrosse stick pocket defined by at least two elongate runners (strips) extending from proximate the scoop of the head toward the throat, and a plurality of inverted V-shaped chevrons straddling the runners and overmolded thereto. The chevrons have a three-dimensional profile, each being slightly concave along their length, and they collectively define a passing/catching chute or channel that increases surface contact with the ball and thereby accuracy of throwing. The surface contact between the chevrons and the ball in combination with the lateral shock-absorbing capability of the chevrons makes throwing and catching easier and more consistent, generally improving playability of the lacrosse stick.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Figure 1:
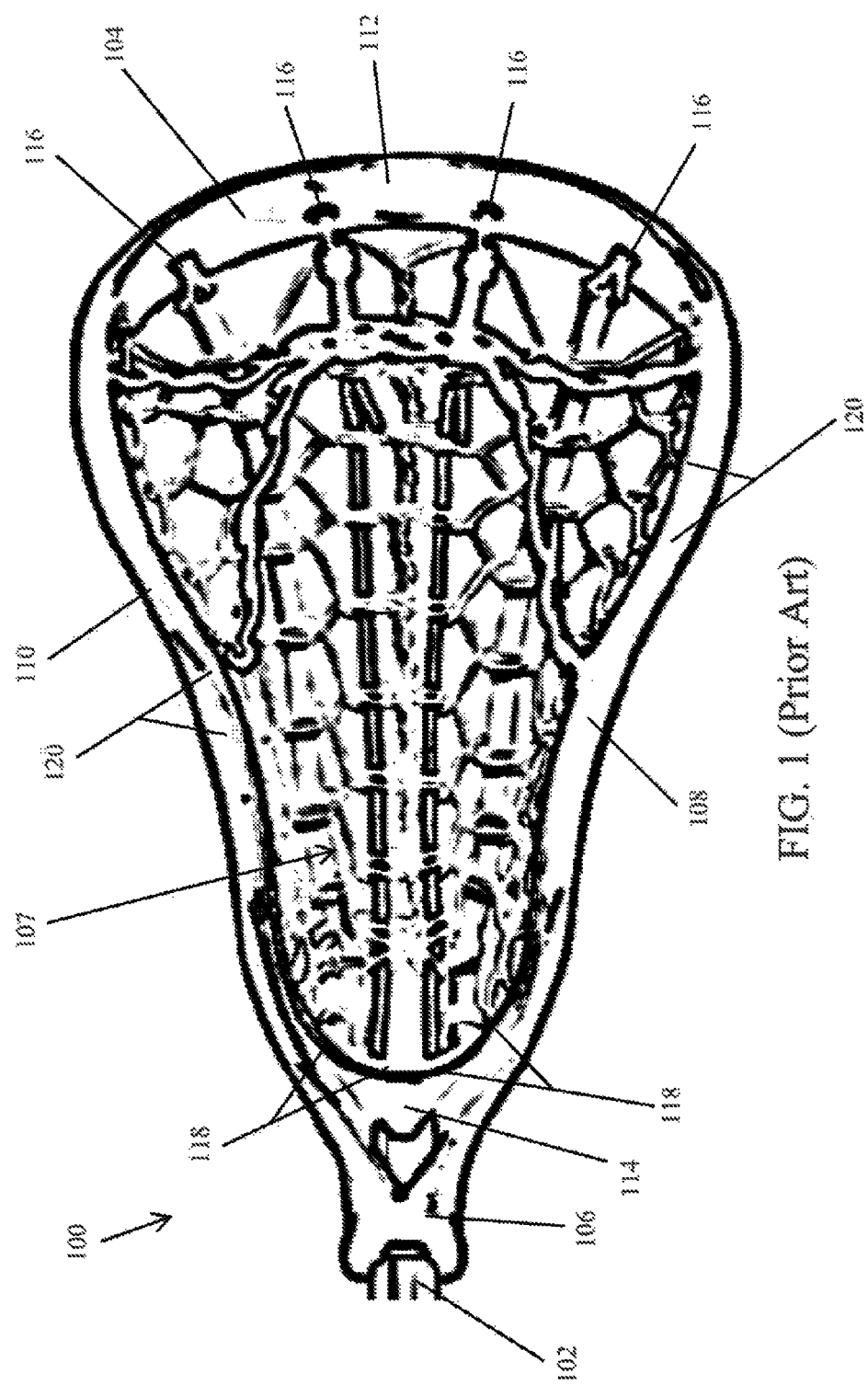
FIG. 1 is a prior art lacrosse head.
Figure 2:
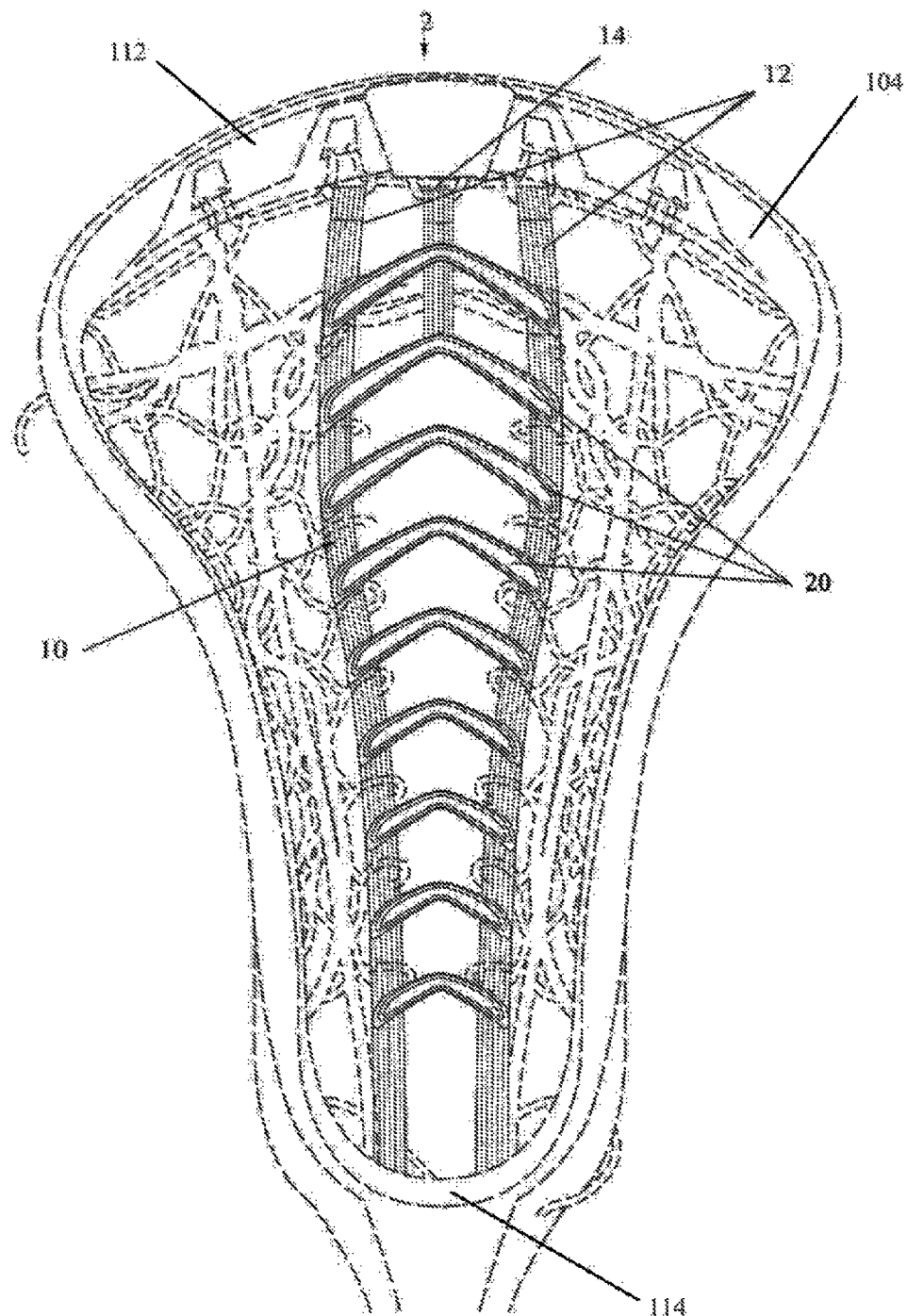
FIG. 2 is a front view of a unitary shooting/catching insert for a lacrosse stick pocket according to an embodiment of the present invention.

An embodiment of an improved shooting/catching section 2 for a lacrosse stick pocket is shown in FIGS. 2-7. The shooting/catching section 2 is secured centrally within peripheral cross-stringing of the pocket (shown in dotted lines), which is in turn affixed to head 104 from upper thong holes 116 in transverse wall 112 to lower thong holes 118 in stop member 114, and to string holes 120 or perimeter side-stringing in sidewalls 108 and 110, as described above with regard to FIG. 1. "Cross-stringing" herein refers to that stringing (shown in dotted lines) that suspends the shooting/catching section 2 within the head and attaches directly to string holes 120 as shown or to a perimeter side-string in sidewalls 108 and 110 as described above with regard to FIG. 1. As shown in FIG. 2, the shooting/catching section 2 includes two full-length elongate runners 12 which run substantially vertically (i.e. from throat to scoop) along the lacrosse head 104 in a spaced relation. Although shown as being generally parallel, the runners 12 may bend or bow slightly and can diverge/converge toward one another as will be described. A third partial-length runner 14 extends from the top of head 104 down partially along its length, generally parallel to runners 12, as shown in FIG. 2.

Figure 3:
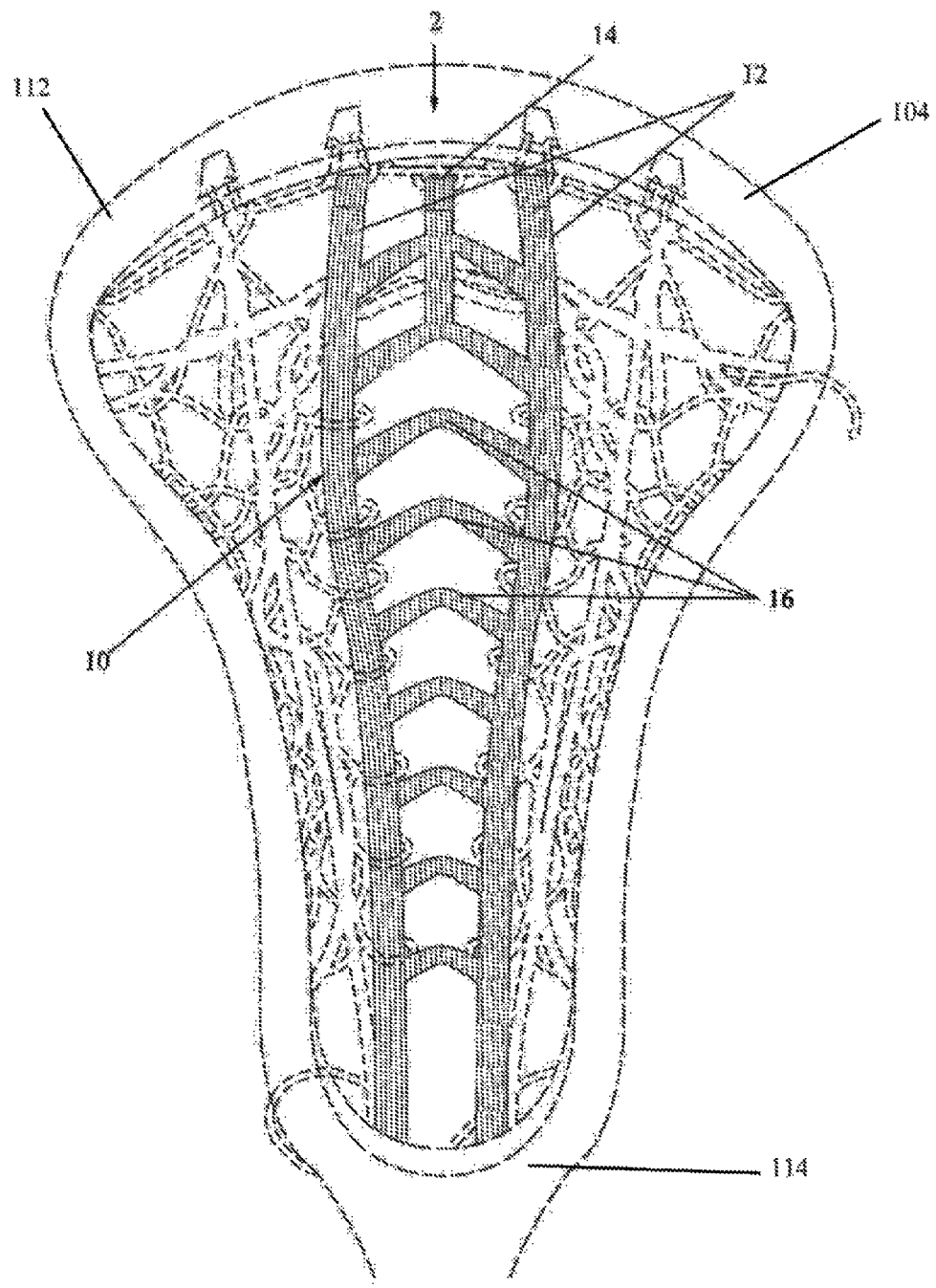
FIG. 3 is a back view of the shooting/catching insert of FIG. 2.

As viewed from the bottom, as seen in FIG. 3, shooting/catching section 2 further comprises a plurality of cross-pieces 16 that straddle the full length of runners 12 transverse thereto. Each of the plurality of cross-pieces 16 comprises an inverted V-shaped member as shown in FIG. 3, with the angle formed by the V-shape pointing up, or towards the scoop 112 of the head 104. In the embodiment shown in FIG. 3, shooting/catching section 2 comprises nine cross-pieces 16, equally-spaced along the length of shooting/catching section 2 beginning a predetermined distance from the throat or stop member 114. Preferably, this predetermined distance is equal to approximately two times the distance separating each of the remaining cross-pieces 16 from one another. However, one having ordinary skill in the art will understand that the total number of cross-pieces 16 and their spacing along the vertical axis of shooting/catching section 2 can be varied according to design and/or player preference, or to fit a specific brand or style of lacrosse stick head 104. Also as shown in FIG. 3, partial-length runner 14 extends downward from scoop 112 from a position equidistant from the points of attachment of full-length runners 12 to scoop 112. Partial-length runner 14 extends roughly parallel to full-length runners 12 and preferably contacts the uppermost few cross-pieces 16 at their midpoint. In a preferred embodiment, partial-length runner 14 intersects and is affixed to the top two cross-pieces 16, i.e. those two cross-pieces 16 closest to scoop 112 when shooting/catching section 2 is attached to head 104, at the base of the "V" formed by cross-pieces 16. Partial-length runner 14 provides additional support to the top portion of shooting/catching section 2 proximate its attachment point to scoop 112 where the width of head 104 is the greatest.

Runners 12, 14 and cross-pieces 16 may be formed as part of a unitary web 10 of material forming a ladder-like shape as shown in FIG. 3. The material chosen for web 10 preferably has synthetic rubber-like properties (such as, for example, chlorosulfonated polyethylene (CSPE) synthetic rubber also known as Hypalon™), but may also be a woven or non-woven material, or an elastomer-coated braided nylon. Web 10 may be cut or stamped from a flat sheet of such material. In one preferred embodiment, shooting/catching section 2 is comprised solely of web 10. In this embodiment, the thickness of web 10 is chosen to provide web 10 with sufficient strength to both withstand the repeated impact of a lacrosse ball and to give structure to the resulting "chute" shape which provides improved ball-release capabilities and allows for easier and more consistent throwing and catching of same as will be described. One skilled in the art will understand that the thickness of web 10 can be varied according to design or player preference, and based on the material from which web 10 is formed, as some materials will require a greater thickness thereof to obtain the same structural qualities as a lesser thickness of a different material. Where web 10 is formed of Hypalon™, as in the preferred embodiment, the desired thickness may be achieved by varying the thickness of a single layer of the nylon weave that makes up the core of the Hypalon™ material, or by welding together one or more layers of nylon weave to achieve a greater thickness. The nylon weave is then coated with an elastomer to form the Hypalon™ material. It will be understood that other means of achieving the desired thickness of web 10 are known in the art and may be used as necessary to increase or decrease the thickness of the material that is chosen for web 10.

In another preferred embodiment, shooting/catching section 2 comprises both web 10 and a plurality of chevrons 20 as shown in FIG. 2. Each of the plurality of chevrons 20 comprises an inverted V-shaped member corresponding to the shape of each of the plurality of cross-pieces 16. Each of the plurality of chevrons 20 is affixed atop a corresponding cross-piece 16 on the top of shooting/catching section 2 proximate the opening of the pocket. In this way, each of the plurality of cross-pieces provides a backing for one of the plurality of chevrons 20 which are adhered thereto. Thus, runners 12, 14 and cross-pieces 16 generally hold the chevrons 20 in a predetermined spatial ladder-like relationship relative to one another. Each of the plurality of chevrons 20 is preferably overmolded atop the corresponding cross-pieces 16 and runners 12, 14 (where cross-pieces 16 connect to runners 12, 14), although any conventional method of combining said materials is considered to be within the scope of the invention, including casting, sonic welding, and overmolding.

Figure 7:
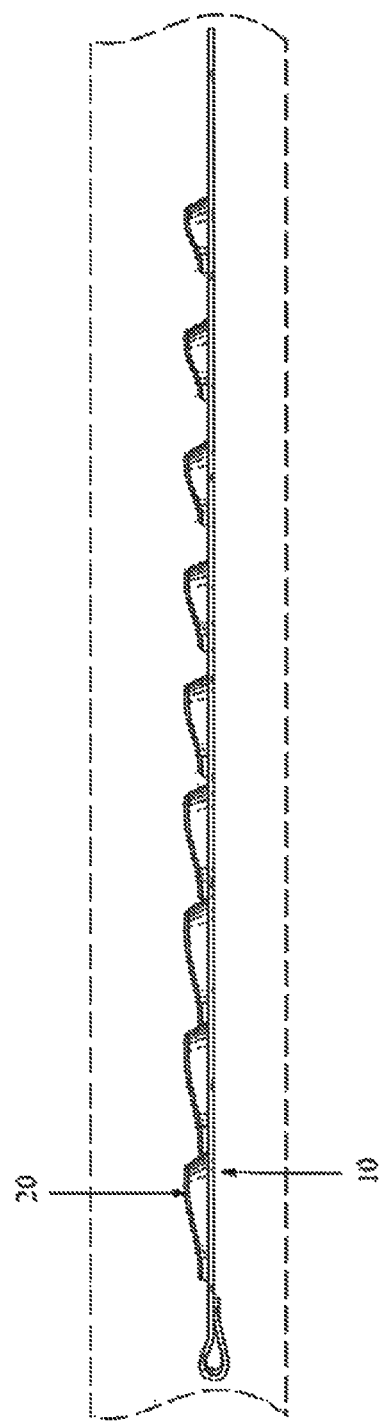
FIG. 7 is a side close-up view of the shooting/catching insert of FIGS. 2-6.

The chevrons 20 can be constructed from a variety of polymeric materials, which include, but are not limited to, elastomeric materials, such as the thermoplastic polymers, thermoplastic polyurethane, thermoplastic resins, thermoplastic copolyesters, thermoplastic polyamides, polyolefin blends, styrenic block polymers, and elastomeric alloys, as well as rubber, formable but flexible resins, hydrophobic flexible materials, or similar flexible materials, or combinations of the foregoing. Preferably, the entire structure of each chevron 20 is formed from a monolithic piece of polymeric material. However, each chevron 20 may be co-molded during or prior to the overmolding process to have multi-color insets to increase aesthetic appeal and/or playability. For example, as seen in FIG. 7, chevrons 20 may be constructed of at least two materials of different durometers including a top surface inset 22 of a second material and a main body 21 of a first material (shown in FIG. 4). For example, the durometer of the first material can be between 30 and 90 (Asker C), and optionally 80; and the durometer of the second material can be between 30 and 90 (Asker C), and optionally 72.

In this second embodiment, the thickness of web 10 may be decreased as necessary due to the additional thickness and structure afforded by the overmolded chevrons 20. As described above, the thickness of web 10 may be controlled by controlling the thickness of the core nylon weave material or the number of layers of nylon weave (when using Hypalon™ as in the preferred embodiment) or by other means known in the art. One skilled in the art would understand that the material of the chevrons 20 can either be heat welded or casted to the web 10, or encapsulate and cover at least a portion of the web 10.

In each of the above-described embodiments, runners 12 generally hold the cross pieces 16 and optional chevrons 20 in a predetermined spatial relationship relative to one another. The inverted V-shape of the cross-pieces 16/chevrons 20 in combination with the elastomeric nature of the cross-pieces 16/chevrons 20 provides a shock-absorbing function within the pocket. Thus, cross-pieces 16/chevrons 20 effectively form a living hinge where either side of the cross-pieces 16/chevrons 20 meet the runners 12, 14, as the cross-pieces 16/chevrons 20 are permitted a lateral degree of freedom to separate upon impact with a ball due to their shape, spacing, and connection to runners 12, 14.

Figure 4:
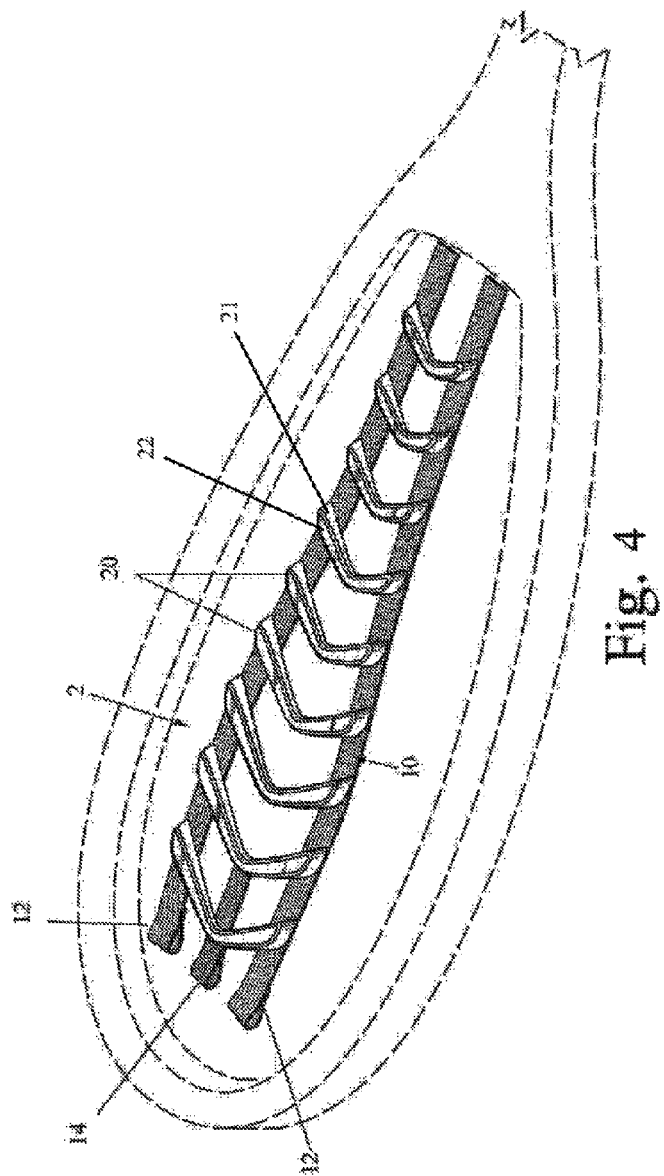
FIG. 4 is a side perspective view of the shooting/catching insert of FIGS. 2-3.
Figure 5:
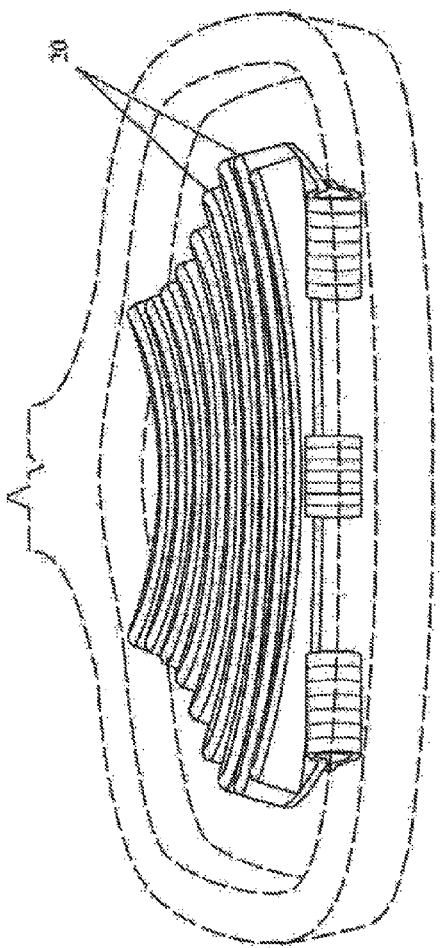
FIG. 5 is a front perspective view of the shooting/catching insert of FIGS. 2-4.
Figure 6:
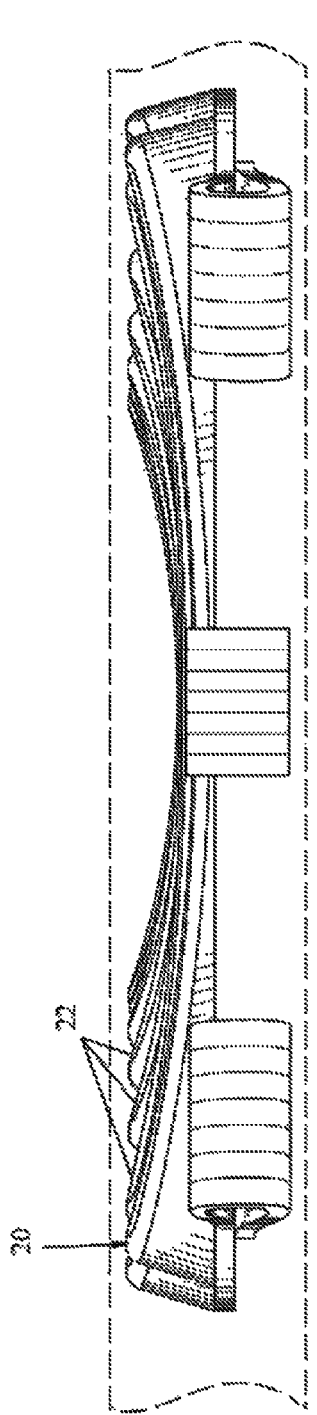
FIG. 6 is a front close-up view of the shooting/catching insert of FIGS. 2-5.

FIGS. 4-7 depict the second preferred embodiment comprising a plurality of chevrons 20 overmolded onto web 10. With collective reference to FIGS. 4-7, each chevron 20 has a three-dimensional shape including a width and thickness that varies along said width. The chevrons 20 each include a top surface facing forward of the head 104 proximate the opening of the pocket and a bottom surface facing rear of the head 104. The rear surface of all chevrons 20 is flat to provide a base that is adhered to cross-pieces 16, which in this preferred embodiment have a flat top to accommodate chevrons 20. However, the top surface of each chevron 20 has an upper contour. Specifically, the thickness of each chevron 20 varies from a maximum of approximately 5 mm at each distal end, proximate each connection with full-length runners 12, and gradually recesses inward to define a concave cross-section having a minimum thickness of about 2 mm at the center (corresponding to the base of the "V"), as best seen in FIG. 6. Viewed from the top, as shown in FIG. 4, the sides of each chevron 20 on either side of the base of the "V" angle inward by approximately 15 degrees, and the edges of each chevron 20 are rounded slightly.

In addition, the lateral width of each successive chevron 20 varies from throat 114 to scoop 112, in the illustrated embodiment generally increasing towards the scoop. The chevrons 20 from the scoop end 112 to the throat 114 are formed and arranged in a sequence of differential widths in order to form a chute or channel of varying width, such that runners 12 are widest where the head 104 is widest and become more narrow as the head shape narrows from top to bottom (see FIG. 3). Toward this end, chevrons 20 may range from about 22 centimeters to 48 centimeters wide. Of course other dimensions may be suitable depending on a player's preferences and style of play. Viewing the collective chevrons 20, this presents a slightly chute-shaped throwing and catching surface as best seen in FIG. 5, which increases accuracy of throwing and shooting. This in combination with the shock-absorbing lateral separation of chevrons 20 makes throwing and catching easier as well as more consistent, generally improving playability of the lacrosse stick. The shape of the chute increases the area of contact between a lacrosse ball and the front surface of the chevrons 20 and thereby increases the player's control over the ball. As the ball sits in the shooting/catching section 2 or travels along its length, the increased contact area improves channeling of the ball and results in greater ball retention, control, and shooting accuracy. In addition, the increased width of chevrons 20 proximate scoop 112 increases the player's control of the ball in the deepest and widest section of the pocket.

While the foregoing has been described with respect to the configuration of chevrons 20 according to the second herein-described preferred embodiment of the instant invention, it will be understood by one having ordinary skill in the art that these same structural features may be incorporated into the first-described embodiment wherein shooting/catching section 2 is comprised of web 10 alone, by varying the thickness of web 10 as described above.

Where shooting/catching section 2 comprises chevrons 20, the manufacturing process may take place as follows: the chevrons 20 are laid out in a mold that corresponds to the shape of the entire shooting/catching section 2, spaced at generally equidistant intervals from one another in the appropriate mold. Then the web 10 material is laid into the mold overtop of the chevrons 20. With the web 10 material placed in the mold, the chevron 20 material is overmolded or otherwise affixed over the web material 10 while the chevrons are maintained in the predetermined spatial relationship by function of the mold. During this process, the chevron material 20 heat welds to the polymeric web 10 so that the chevron material minimally overlaps polymeric web 10. Alternatively, chevron 20 material may encapsulate at least a portion of the polymeric web 10 for a stronger connection. In either case, the polymeric material generally engages and welds to the chevrons 20 resulting in a unitary insert 2. It will be understood by a person having ordinary skill in the art that a variety of molds may be designed or chosen based on design and/or player preference.

One having ordinary skill in the art would also understand that a variety of other techniques can be utilized for the molding process. For example, the polymeric material can be injection molded into a cavity formed above and/or below the respective components. Other molding operations and techniques can be used as desired.

Where shooting/catching section 2 is formed solely of the single material comprising web 10, the manufacturing process may proceed as described above. Namely, after the thickness of various parts of web 10 is chosen, the core weave material may be designated or layered and welded to form the characteristics of web 10 as described herein. Then, the weave material may be coated in elastomer to form Hypalon™ web 10. It will be understood that where web 10 is formed from a material other than Hypalon™, other methods of manufacture known in the art may be used to achieve the configuration of shooting/catching section 2 as herein described.

In use, shooting/catching section 2 is affixed to head 104 by lacing each end of runners 12, 14 through upper and lower thong holes 116, 118 proximate the scoop and throat, respectively, of head 104. The remainder of the pocket is then attached by threading perimeter side stringing through string holes 120 in sidewalls 108 and 110, looping them around runners 12 between cross-pieces 16/chevrons 12 as shown in FIG. 2 (in dotted line). As can be seen, the shooting/catching section 2 according to the present invention allows for easier installation into the head of a lacrosse stick versus the prior art.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:
1. A lacrosse stick pocket, comprising:
   at least two elongate runners;
   cross-stringing connected peripherally to said at least two elongate runners;
   a plurality of V-shaped cross-pieces independent from said cross stringing, straddling said at least two elongate runners and connected there across in a ladder-like configuration;
   a plurality of V-shaped chevrons, each of said plurality of V-shaped chevrons being attached across a correspond- ing one of said plurality of V-shaped cross-pieces, wherein a thickness of said plurality of V-shaped chevrons increases away from a base of the "V" such that each of said plurality of V-shaped chevrons forms the shape of a shallow "U" when viewed in cross-section.

2. The lacrosse stick pocket according to claim 1, wherein said elongate runners and said plurality of V-shaped cross-pieces are formed from the same material, which is a different material from said cross stringing.

3. The lacrosse stick pocket according to claim 2, wherein said elongate runners and said plurality of V-shaped cross-pieces are formed from chlorosulfonated polyethylene synthetic rubber.

4. The lacrosse stick pocket according to claim 3, wherein said elongate runners and said plurality of V-shaped cross-pieces are formed from two layers of chlorosulfonated polyethylene synthetic rubber weave material that have been welded together and coated with an elastomer.

5. The lacrosse stick pocket according to claim 1, wherein said plurality of V-shaped chevrons are formed from a polymer.

6. The lacrosse stick pocket according to claim 5, wherein said plurality of V-shaped chevrons are formed from thermoplastic polyurethane.

7. The lacrosse stick pocket according to claim 2, wherein said elongate runners and said plurality of V-shaped cross-pieces are formed from die-cutting a single piece of material.

8. The lacrosse stick pocket according to claim 2, wherein said elongate runners and said plurality of V-shaped cross-pieces are formed from an elastomer material.

9. The lacrosse stick pocket according to claim 1, wherein said plurality of V-shaped cross-pieces each have two legs that both intersect a line at an angle of approximately 15 degrees.

10. The lacrosse stick pocket according to claim 1 wherein the thickness of distal ends of each of said plurality of V-shaped chevrons is approximately 5 mm, and wherein the thickness of centers portions of each of said plurality of V-shaped chevrons is approximately 2 mm.

11. A lacrosse stick pocket, comprising:
at least two elongate runners;
cross-stringing connected peripherally to said at least two elongate runners;
a plurality of V-shaped cross-pieces independent from said cross stringing, straddling said at least two elongate runners and connected there across in a ladder-like configuration;
a plurality of V-shaped chevrons, each of said plurality of V-shaped chevrons being attached across a corresponding one of said plurality of V-shaped cross-pieces, wherein a length of each of said plurality of V-shaped chevrons increases towards a top end of said pocket.

12. The lacrosse stick pocket according to claim 11, further comprising at least one partial-length runner having a length that is shorter than a length of said at least two elongate runners, wherein said at least one partial-length runner is attached to at least one of said plurality of V-shaped cross-pieces between the points of attachment of said at least one of said plurality of V-shaped cross-pieces with said at least two elongate runners.

13. The lacrosse stick pocket according to claim 12 wherein said at least one partial-length runner is located proximate the top end of said pocket.

14. The lacrosse stick pocket according to claim 11, wherein said plurality of V-shaped chevrons further comprise a main body formed from a first material and a top surface inset formed from a second material, wherein said first and second materials have different durometers.

15. The lacrosse stick pocket according to claim 11 wherein said at least two elongate runners run scoop-to-throat across a lacrosse head and said plurality of cross-pieces are inverted V-shaped scoop-to-throat.

* * * * *